(12) United States Patent
Matthews et al.

(10) Patent No.: US 6,905,618 B2
(45) Date of Patent: Jun. 14, 2005

(54) DIFFRACTIVE OPTICAL ELEMENTS AND METHODS OF MAKING THE SAME

(75) Inventors: James Albert Matthews, Milpltas, CA (US); Wayne H. Grubbs, Cupertino, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 325 days.

(21) Appl. No.: 10/208,570

(22) Filed: Jul. 30, 2002

(65) Prior Publication Data

US 2004/0020892 A1 Feb. 5, 2004

(51) Int. Cl.⁷ .............................................. B29D 11/00
(52) U.S. Cl. ............................. 216/24; 216/26; 216/83; 216/95; 216/99
(58) Field of Search ............................. 216/24, 26, 83, 216/95, 99

(56) References Cited

U.S. PATENT DOCUMENTS

| | | | |
|---|---|---|---|
| 4,895,790 A | 1/1990 | Swanson et al. | |
| 5,218,471 A | 6/1993 | Swanson et al. | |
| 6,021,106 A | 2/2000 | Welch et al. | |
| 6,120,942 A | * 9/2000 | Reinberg ........................ | 430/5 |
| 6,187,211 B1 | 2/2001 | Smith et al. | |
| 6,301,001 B1 | 10/2001 | Unno | |
| 6,365,455 B1 | * 4/2002 | Su et al. ....................... | 438/257 |
| 6,369,948 B2 | 4/2002 | Danziger et al. | |
| 6,387,787 B1 | * 5/2002 | Mancini et al. ............. | 438/586 |
| 6,392,792 B1 | 5/2002 | Naulleau | |
| 6,562,253 B1 | * 5/2003 | Ogusu .......................... | 216/24 |
| 6,670,105 B2 | 12/2003 | Terada et al. | |
| 2002/0047129 A1 | 4/2002 | Frick et al. | |

* cited by examiner

*Primary Examiner*—Nadine G. Norton
*Assistant Examiner*—Binh X. Tran

(57) ABSTRACT

Diffractive optical elements and methods of making the same are described. In one aspect, a diffractive optical element is made by forming a multilayer structure comprising multiple amorphous silicon phase shift layers having respective thicknesses selected so that the diffractive optical element is operable to phase shift infrared light within an operative wavelength range. The amorphous silicon phase shift layers are separated by respective silicon dioxide etch stop layers having respective thicknesses of about 5 nm or less. Layers of the multilayer structure are serially masked and etched to form a multi-step optical structure. In another aspect, a diffractive optical element is made by forming a multilayer structure comprising multiple etch layers separated by respective etch stop layers selectively etchable with respect to the etch layers. One or more of the etch and etch stop layers are substantially opaque to light within an operative wavelength range. Opaque layers are converted into substances substantially transparent to light within the operative wavelength range. Layers of the multilayer structure are serially masked and etched to form a multi-step optical structure.

32 Claims, 4 Drawing Sheets

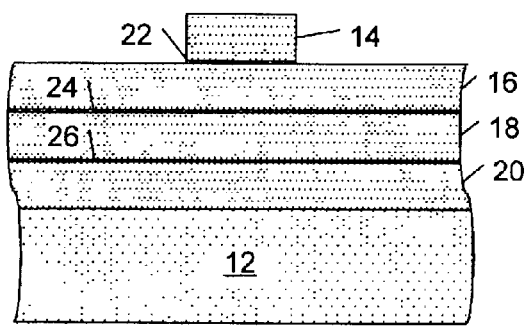
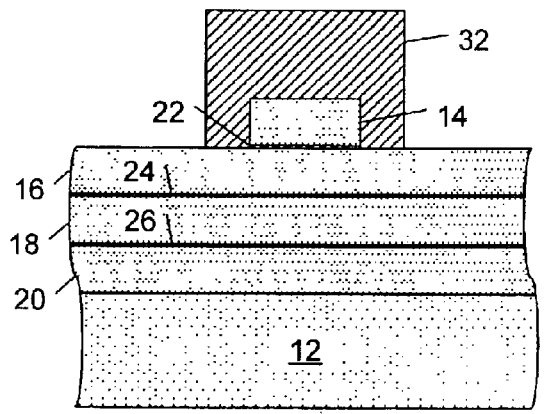
FIG. 2C  FIG. 3A
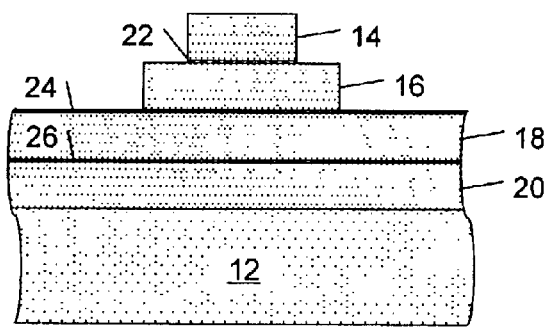
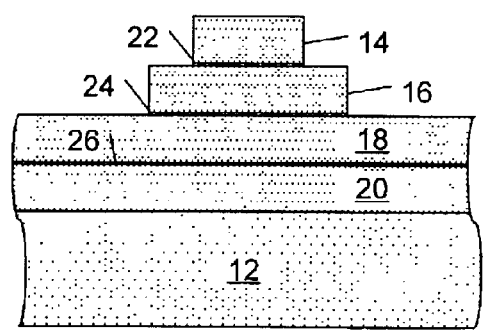
FIG. 3B  FIG. 3C

US 6,905,618 B2

DIFFRACTIVE OPTICAL ELEMENTS AND METHODS OF MAKING THE SAME

TECHNICAL FIELD

This invention relates to diffractive optical elements.

BACKGROUND

Diffractive optical elements may be implements in a wide variety of different forms, such as Fresnel zone plates, diffusers, kinoforms, phase gratings, and holograms, and may be used in a wide variety of different optical applications, including high resolution imaging systems and fiber optic coupler interconnect systems. Recently, diffractive optical elements have been developed to perform complicated phase transformations of incident radiation, such as wavefront conversion. Diffractive optical elements may be reflection-type diffractive optical elements or they may be transmission-type diffractive optical elements.

In general, diffractive optical elements should have high diffraction efficiencies. In order to achieve 100% diffraction efficiency, a continuous phase profile is required within any given period, but device structures that provide such continuous phase profiles are difficult to manufacture. A continuous phase profile may be approximated, however, by a multilevel diffractive optical element having a set of discrete phase levels. The larger the number of discrete phases levels, the better the approximation to the corresponding continuous phase profile. Such diffractive optical elements may be constructed with relatively high efficiencies and are easier to manufacture than diffractive optical elements providing continuous phase profiles. A multilevel diffractive optical element typically is manufactured by generating a set of binary amplitude etch masks and serially masking and etching multiple levels of a material structure. The step heights of the levels of a multilevel diffractive optical element may be the same or they may be different (e.g., the step heights may be weighted binarially).

The multilevel surface profiles of stepped diffractive optical elements may be manufactured using standard, semiconductor integrated circuit fabrication techniques. However, etch processes should be optimized to achieve accurate and repeatable etch depths for the different phase levels. In general, etch processes that rely on control of etch rate and etch time are difficult to implement and often suffer from microloading proximity effects in which the local etch rate varies with the local pattern density such that the resulting phase shift of each level varies with pattern density. U.S. Pat. No. 6,392,792 has proposed a method of fabricating a reflection-type multilevel diffractive optical element from an etch stack consisting of alternating layers of two different materials that exhibit good etch selectivity properties such that adjacent stack layers provide natural etch stops for each other. The '792 patent describes an etch stack with alternating layers of silicon and silicon dioxide that have substantially equal heights. After the etch stack layer has been etched, an overcoat of a multilayer reflection stack is formed over the etched structure to complete the device.

SUMMARY

The invention features inventive diffractive optical elements and inventive methods of making the same.

In one aspect of the invention, a diffractive optical element is made by forming a multilayer structure comprising multiple amorphous silicon phase shift layers having respective thicknesses selected so that the diffractive optical element is operable to phase shift infrared light within an operative wavelength range. The amorphous silicon phase shift layers are separated by respective silicon dioxide etch stop layers having respective thicknesses of about 5 nm or less. Layers of the multilayer structure are serially masked and etched to form a multi-step optical structure.

In another aspect, the invention features a diffractive optical element comprising a multi-step structure including multiple amorphous silicon phase shift layers having respective thicknesses selected to phase shift infrared light within an operative wavelength range. The amorphous silicon phase shift layers are separated by respective silicon dioxide etch stop layers having respective thicknesses of about 5 nm or less.

In another aspect of the invention, a diffractive optical element is made by forming a multilayer structure comprising multiple etch layers separated by respective etch stop layers selectively etchable with respect to the etch layers. One or more of the etch and etch stop layers are substantially opaque to light within an operative wavelength range. Opaque layers are converted into substances substantially transparent to light within the operative wavelength range. Layers of the multilayer structure are serially masked and etched to form a multi-step optical structure.

Other features and advantages of the invention will become apparent from the following description, including the drawings and the claims.

DESCRIPTION OF DRAWINGS

FIG. 2C is a diagrammatic cross-sectional side view of the multilayer structure of FIG. 2B after a top etch stop layer has been etched.

FIG. 3A is a diagrammatic cross-sectional side view of the multilayer structure of FIG. 2C with an overlying patterned layer of photoresist.

FIG. 3B is a diagrammatic cross-sectional side view of the multilayer structure of FIG. 3A after a second phase shift layer has been etched.

FIG. 3C is a diagrammatic cross-sectional side view of the multilayer structure of FIG. 3B after a second etch stop layer has been etched.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
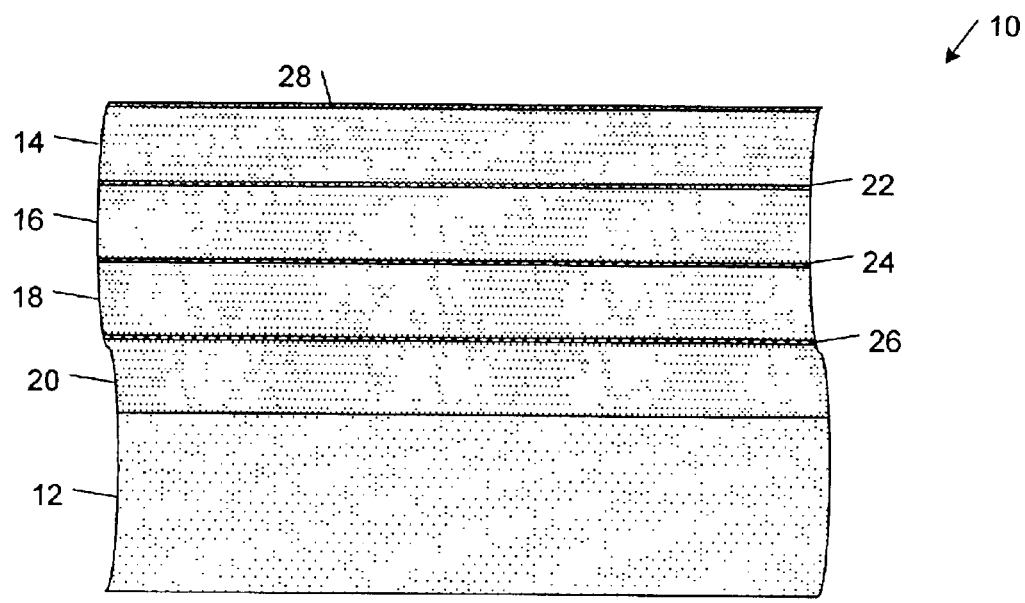
FIG. 1 is diagrammatic cross-sectional side view of a multilayer structure that includes multiple phase shift layers separated by respective etch stop layers.

Referring to FIGS. 1, 2A, 2B, 2C, 3A, 3B, 3C and 4, an initially to FIG. 1, in some embodiments, a diffractive optical element may be formed as follows. Initially a multilayer structure 10 is formed on a substrate 12. The multilayer structure 10 includes multiple phase shift layers 14, 16, 18, 20 separated by respective etch stop layers 22, 24, 26. In the illustrated embodiment, the multilayer structure 10 includes four phase shift layers. In other embodiments, the multilayer structure 10 may include more or fewer phase shift layers. The phase shift layers 14–20 have respective thicknesses that are selected to phase shift light within an operative wavelength range (e.g., infrared light). In transmission-type embodiments, the phase shift layers 14–20, the etch stop layers 22–26, and the substrate 12 are substantially transparent to light within the operative wavelength range. In some of these embodiments, the etch stop layers 22–26 are substantially indexed-matched to the phase shift layers 14–20 to avoid the formation of an interference filter in series with the diffractive optical element. In other embodiments the etch stop layers 22–26 have respective thickness that are substantially smaller than the light wavelengths within the operative wavelength range to avoid the creation of such an interference filter. In the illustrated embodiment, the multilayer structure 10 also includes an oxide cap layer 28.

In one exemplary embodiment that is designed for creating a transmission-type diffractive optical element that is operable within the infrared wavelength range, substrate 12 may be formed from a material (e.g., silicon, quartz, sapphire, and borosilicate glass) that is substantially transparent to infrared light. Phase shift layers 14–20 are formed from amorphous silicon. The amorphous silicon phase shift layers may be deposited by a chemical vapor deposition process (e.g., low pressure chemical vapor deposition (LPCVD) or plasma enhanced chemical vapor deposition (PECVD)) at a temperature preferably below about 600° C., and more preferably at about 550° C. LPCVD deposition at 550° C. is preferred because the resulting phase shift layers have accurately controlled thicknesses and are substantially smooth and featureless. In this exemplary embodiment, each phase shift layer has a thickness equal to a fraction of the target operative wavelength. This thickness may be in the range of about 50 nm to about 500 nm. Etch stop layers 22–26 are formed from silicon dioxide, which may be grown thermally or may be deposited by a chemical vapor deposition process (e.g., PECVD). After each phase shift layer has been formed, silicon dioxide etch stop layers may be grown thermally on the exposed surfaces of respective phase shift layers by heating to a temperature preferably below about 600° C., and more preferably at about 550° C. Maintaining the thermal oxidation temperature below about 600° C. avoids the formation of rough silicon asperities on the top surfaces of each of the amorphous silicon phase shift layers. To avoid the formation of an interference filter in series with the diffractive optical element, the thicknesses of etch stop layers 22–26 preferably are less than about 5 nm, and more preferably are about 2 nm or less.

Referring to FIGS. 2A–2C and 3A–3C, after the multilayer structure 10 has been formed on substrate 12, a multi-step optical structure corresponding to the final diffractive optical element may be formed by serially masking and etching through the layers of multilayer structure 10 as follows. This process is described in terms of the above-described exemplary embodiment.

Figures 2A, 2B:
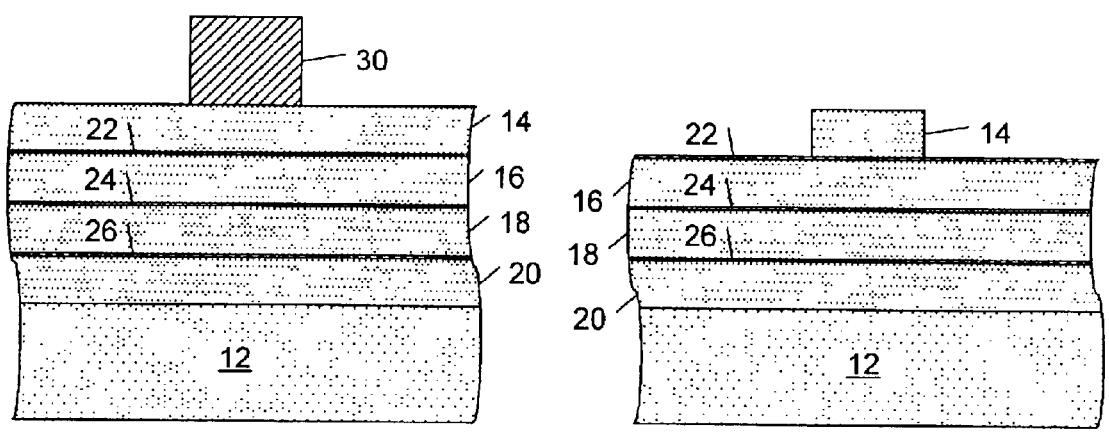
FIG. 2A is a diagrammatic cross-sectional side view of the multilayer structure of FIG. 1 after a top oxide layer has been removed and after a patterned layer of photoresist has been formed on a top phase shift layer.
FIG. 2B is a diagrammatic cross-sectional side view of the multilayer structure of FIG. 2A after the top phase shift layer has been etched.

Initially, the oxide cap layer 28 (if present) may be removed by dipping the structure in a dilute (e.g., 50:1) water: hydrofluoric acid (HF) solution. Next, photoresist is spun onto the top surface of the exposed phase shift layer 14, prebaked, exposed with the first mask layer, and developed to form a patterned photoresist layer 30 on the surface of the exposed phase shift layer 14 (FIG. 2A). An advantageous feature of the amorphous silicon/silicon dioxide material system of the exemplary embodiment is that it is highly absorbing of the ultraviolet light that typically is used to form the patterned photoresist layer 30 and, therefore, avoids back reflections that otherwise might degrade the fidelity of the photoresist pattern. Phase shift layer 14 may be etched to form the top layer of the final diffractive optical element (FIG. 2B). In the case of the exemplary embodiment, the phase shift layer 14 is etched using a conventional plasma etcher that is configured to etch polysilicon (e.g., a conventional CMOS gate etcher). Such a plasma etch has a high (e.g., 50:1 or greater) etch selectivity between silicon and silicon dioxide and maintains vertical sidewalls between the etched and the unetched regions. Phase shift layer 14 is etched until the etch process effectively stops at the etch stop layer 22. Exposed regions of etch stop layer 22 are removed by dipping the multilayer structure in a dilute (e.g., 50:1) water: hydrofluoric acid (HF) solution (FIG. 2C). The multilayer structure then is dried in preparation for processing the next phase shift layer 16.

Referring to FIGS. 3A–3C, photoresist is spun over the patterned phase shift layer 14 and the exposed surface of phase shift layer 16. The photoresist then is prebaked, exposed with the second mask layer, and developed to form a patterned photoresist layer 32 (FIG. 3A). As with the top phase shift layer 14, phase shift layer 16 may be etched to form the second layer of the final diffractive optical element (FIG. 3B). In the case of the exemplary embodiment, the phase shift layer 16 is etched using a conventional plasma etcher that is configured to etch polysilicon (e.g., a conventional CMOS gate etcher). Exposed regions of etch stop layer 24 are removed by dipping the multilayer structure in a dilute (e.g., 50:1) water:hydrofluoric acid (HF) solution (FIG. 3C). The multilayer structure then is dried in preparation for processing the next phase shift layer 18.

Figure 4:
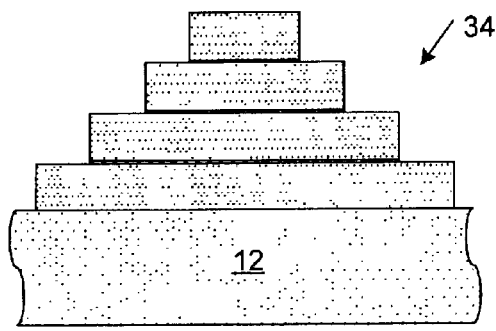
FIG. 4 is a diagrammatic cross-sectional side view of a multi-step optical structure formed by serially masking and etching the multilevel structure of FIG.

Referring to FIG. 4, the remaining phase shift layers 18 and 20 are processed using photolithography and etching steps similar to those used to process phase shift layers 14 and 16 until a final multi-step optical structure 34 is formed. This structure may be used directly as a diffractive optical element for infrared radiation, in the case of the exemplary embodiment. Antireflection coatings or protective coatings may be deposited on the multi-step optical structure 34. Alternatively, a single- or multi-layer reflective coating (e.g., aluminum, or a combination of chrome and gold) may be deposited over the exposed surfaces of the multi-step optical structure 34 to form a reflective-type diffractive optical element.

Figure 5:
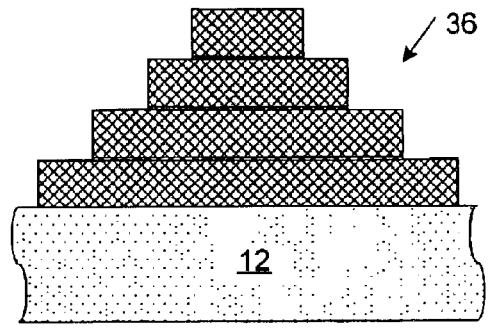
FIG. 5 is a diagrammatic cross-sectional side view of the multi-step optical structure of FIG. 4 after opaque layers have been converted into substances substantially transparent to light within an operative wavelength range.

Referring to FIG. 5, in some embodiments, the multi-step structure 34 of FIG. 4 may be oxidized to convert regions that are opaque with respect to light in a different operative wavelength range (e.g., near infrared and visible wavelength ranges) and, thereby, extend the operable wavelength range of the resulting transmission-type diffractive optical element. For example, with respect to the exemplary embodiment, the multi-step optical structure 34 may be heated to a temperature of about 1,000° C. in steam to convert the amorphous silicon phase shift layers 14–20 into silicon dioxide (amorphous quartz), which has a transparent wavelength range that extends into shorter wavelengths (e.g., 850 nm) than the transparent wavelength range of silicon. The resulting structure 36 is a multilayer monolithic pure silicon dioxide structure. This structure may be used directly as a diffractive optical element for a wide range of radiation wavelengths, in the case of the exemplary embodiment. Antireflection coatings or protective coatings may be deposited on the multi-step optical structure 36. Alternatively, a single- or multi-layer reflective coating (e.g., aluminum, or a combination of chrome and gold) may be deposited over the exposed surface of the multi-step optical structure to form a reflective-type diffractive optical element.

Figure 6A:
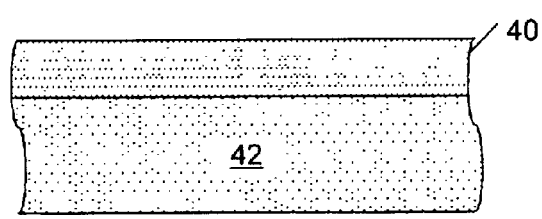
FIG. 6A is a diagrammatic cross-sectional side view of a convertible layer disposed on a substrate.
Figure 6B:
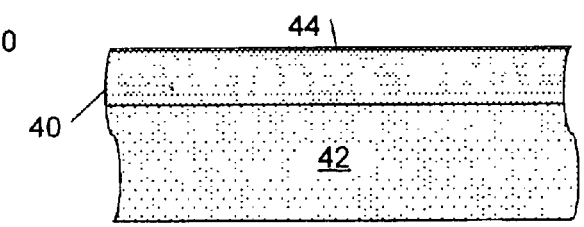
FIG. 6B is a diagrammatic cross-sectional side view of the convertible layer of FIG. 6A after a top cap portion has been oxidized.
Figure 6C:
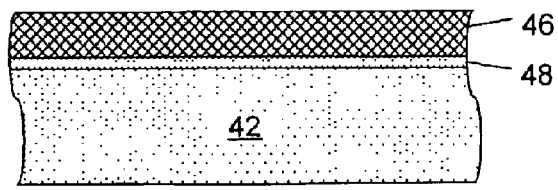
FIG. 6C is a diagrammatic cross-sectional side view of the convertible layer of FIG. 6B after a top portion has been oxidized to form an etch layer over an etch stop layer.

Referring to FIGS. 6A, 6B, 6C, 7, 8, and 9, an initially to FIGS. 6A–6C, in other embodiments, a diffractive optical element may be formed as follows. Initially, an amorphous silicon layer 40 is formed on a substrate 42 (FIG. 6A). The amorphous silicon layer may be deposited by a chemical vapor deposition process (e.g., low pressure chemical vapor deposition (LPCVD) or plasma enhanced chemical vapor deposition (PECVD)) at a temperature preferably below about 600° C., and more preferably at about 550° C. The amorphous silicon layer 40 has a thickness such that, after being converted into silicon dioxide, the resulting layer is operable to phase shift light within the selected operative wavelength range (e.g., infrared or visible light). For transmission-type diffractive optical elements, substrate 42 may be formed from a material (e.g., silicon, quartz, sapphire, and borosilicate glass for infrared and visible light) that is substantially transparent to light within a selected operative optical wavelength range. Next, the amorphous silicon layer 40 is oxidized to form a thin cap layer 44 with a thickness on the order of about 2–5 nm. In some embodiments, cap layer 44 may be grown thermally in steam at a temperature preferably below about 600° C., and more preferably at a temperature of about 550° C. Growing cap layer 44 at a temperature below about 600° C. allows the cap layer 44 to be formed with the same smooth, featureless surface of the original amorphous silicon layer 40. In addition, forming cap layer 44 in this way avoids the formation of rough silicon asperities that otherwise might form if the amorphous silicon layer 40 were heated directly at a temperature above about 600° C. After cap layer 44 is formed, the amorphous silicon layer 40 may be heated at a higher temperature (e.g., about 1,000° C.) in steam to form a silicon dioxide etch layer 46. During this high temperature thermal oxidation process, the remaining portion of the original amorphous silicon layer 40 is converted to polysilicon. This polysilicon layer corresponds to an etch stop layer 48 with a thickness that is on the order of about 10 nm. The initial, low temperature oxidation process that is used to form the cap layer 44 suppresses the formation of silicon asperities that otherwise might be produced during the conversion of amorphous silicon into polysilicon.

Figure 7:
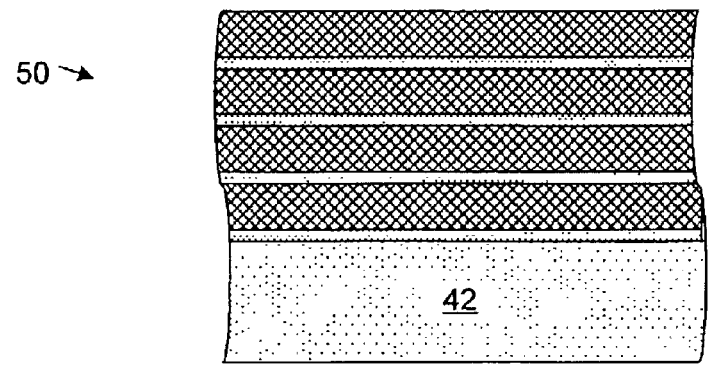
FIG. 7 is a diagrammatic cross-sectional side view of a multilayer structure that includes multiple etch and etch stop layers formed over the structure of FIG. 6C.

Referring to FIG. 7, the process of depositing amorphous silicon, followed by sequential low temperature thermal oxidation and high temperature thermal oxidation is repeated until a multilayer structure 50 having a desired number of phase shift levels (e.g., four levels in the illustrated embodiment) is formed.

Figure 8:
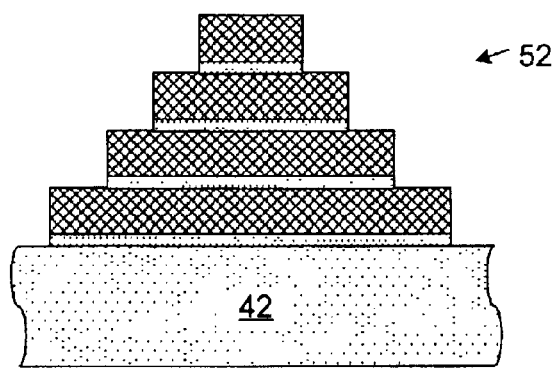
FIG. 8 is a diagrammatic cross-sectional side view of a multi-step optical structure formed by serially masking and etching the multilevel structure of FIG. 7.

Referring to FIG. 8, after the multilayer structure 50 has been formed, a multi-step optical structure 52 corresponding to a final diffractive optical element may be formed by serially masking and etching through the layers of multilayer structure 50 as follows. Initially, photoresist is spun onto the top surface of the exposed etch layer, prebaked, exposed with the first mask layer, and developed to form a patterned photoresist layer on the surface of the exposed etch layer. An advantageous feature of the polysilicon/silicon dioxide material system of the exemplary embodiment is that it is highly absorbing of the ultraviolet light typically used to form the patterned resist layer and, therefore, avoids back reflections that otherwise might degrade the fidelity of the photoresist pattern. The etch layer may be etched to form the top layer of the final diffractive optical element. In the case of the exemplary embodiment, the etch layer is etched using a conventional plasma etcher that is configured to etch silicon dioxide and stop on silicon (e.g., a conventional CMOS contact etcher). Such a plasma etch has a high (e.g., 20:1 or greater) etch selectivity between silicon dioxide and silicon and maintains vertical sidewalls between the etched and the unetched regions. The etch layer is etched until the etch process effectively stops at the underlying etch stop layer. The etch stop layer then is removed using a conventional plasma etcher that is configured to etch polysilicon (e.g., a conventional CMOS gate etcher). Such a plasma etch has a high (e.g., 50:1 or greater) etch selectivity between silicon and silicon dioxide and maintains vertical sidewalls between the etched and the unetched regions. The multilayer structure then is dried in preparation for processing the next etch layer. The remaining layers of the multilayer structure 50 are processed using photolithography and etching steps similar to those used to process the top etch and etch stop layers until the final multi-step optical structure 52 is formed.

Figure 9:
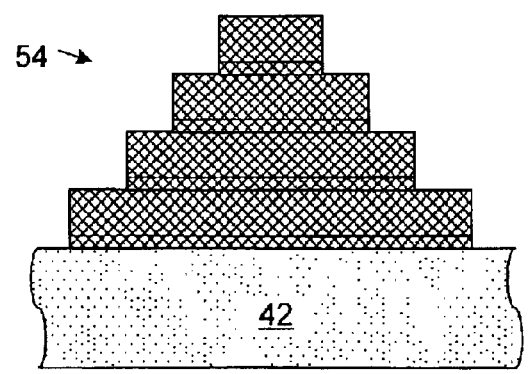
FIG. 9 is a diagrammatic cross-sectional side view of the multi-step optical structure of FIG. 8 after opaque layers have been converted into substances substantially transparent to light within an operative wavelength range.

Referring to FIG. 9, after formation, the multi-step structure 52 of FIG. 8 is oxidized to convert regions that are opaque with respect to light in a desired operative wavelength range (e.g., near infrared and visible wavelength ranges) to obtain an extended wavelength, transmission-type diffractive optical element. For example, the multi-step optical structure 52 may be heated to a temperature of about 1,000° C. in steam to convert the polysilicon etch stop layers into silicon dioxide (amorphous quartz), which has a transparent wavelength range that extends to shorter wavelengths (e.g., 850 nm and shorter) than the transparent wavelength range of silicon. The resulting structure 54 is a multilayer monolithic pure silicon dioxide structure. This structure may be used directly as a diffractive optical element for a wide range of radiation wavelengths. Antireflection coatings or protective coatings may be deposited on the multi-step optical structure 54. Alternatively, a single- or multi-layer reflective coating (e.g., aluminum, or a combination of chrome and gold) may be deposited over the exposed surface of the multi-step optical structure 54 to form a reflective-type diffractive optical element.

Other embodiments are within the scope of the claims. For example, in some embodiments, the diffractive optical element fabrication process described above may be used to manufacture stamping masters that may be used to produce diffractive optics in soft materials, such as polymers and sol-gel materials. In these embodiments, a piece of the substrate carrying the multi-step optical structure is used to imprint the surface of the softer material, thereby transferring a complex diffractive pattern to the softer material. In general, the resulting replica is an inversion of the stamping master (the high spots on the replica correspond to the low spots on the master) and the stamping master should be designed accordingly.

What is claimed is:

1. A method of fanning a diffractive optical element, comprising:
    forming a multilayer structure comprising multiple amorphous silicon phase shift layers having respective thicknesses selected so that the diffractive optical element is operable to phase shift infrared light within an operative wavelength range and being separated by respective silicon dioxide etch stop layers having respective thicknesses of about 5 nm or less; and
    serially masking and etching layers of the multilayer structure to form a multi-step optical structure.

2. The method of claim 1, wherein each etch stop layer has a thickness of about 2 nm or less.

3. The method of claim 1, further comprising converting amorphous silicon phase shift layers in the multi-step optical structure into silicon dioxide phase shift layers.

4. The method of claim 1, further comprising forming over the multi-step optical structure a layer substantially reflective of radiation within the operative wavelength range.

5. The method of claim 1, further comprising imprinting the multi-step optical structure into a material softer than the multi-step optical structure to transfer a diffraction pattern into the softer material.

6. The method of claim 1, wherein the multi-step optical structure comprises a stacked sequence of patterned ones of the amorphous silicon phase shift layers each having a respective thickness and a respective lateral size, and the stacked sequence is ordered by the lateral sizes of the patterned ones of the amorphous silicon phase shift layers.

7. The method of claim 1, wherein forming the multilayer structure comprises depositing amorphous silicon phase shift layers by chemical vapor deposition.

8. The method of claim 7, wherein the amorphous silicon phase shift layers are deposited by low pressure chemical vapor deposition.

9. The method of claim 7, wherein the amorphous silicon phase shift layers are deposited at a temperature below about 600° C.

10. The method of claim 1, wherein forming the multilayer structure comprises thermally growing silicon etch stop layers on respective ones of the amorphous silicon phase shift layers.

11. The method of claim 10, wherein the silicon dioxide etch stop layers are thermally grown in steam at a temperature below about 600° C.

12. The method of claim 1, wherein forming the multilayer structure comprises depositing silicon dioxide etch stop layers on respective ones of the amorphous silicone phase shift layers.

13. The method of claim 12, wherein the silicon dioxide etch stop layers are deposited by chemical vapor deposition.

14. A method of forming a diffractive optical element, comprising:
    forming a multilayer structure comprising multiple etch layers separated by respective etch stop layers selectively etchable with respect to the etch layers, one or more of the etch and etch stop layers being substantially opaque to light within an operative wavelength range;
    converting opaque layers into substances substantially transparent to light within the operative wavelength range; and
    serially masking and etching layers of the multilayer structure to form a multi-step optical structure.

15. The method of claim 14, wherein etch layers and etch stop layers are characterized by mutual etch selectivity.

16. The method of claim 14, wherein each etch stop layer has a thickness of about 5 nm or less.

17. The method of claim 14, further comprising forming over the multi-step optical structure a layer substantially reflective of radiation within the operative wavelength range.

18. The method of claim 14, further comprising imprinting the multi-step optical structure into a material softer than the multi-step optical structure to transfer a diffractive pattern into the softer material.

19. The method of claim 14, wherein etch layers are formed of amorphous silicon and etch stop layers are formed of silicon dioxide.

20. The method of claim 19, wherein converting opaque layers comprises converting amorphous silicon etch layers in the multi-step optical structure into silicon dioxide layers.

21. The method of claim 19, wherein forming the multilayer structure comprises thermally growing silicon dioxide etch stop layers on respective amorphous silicon etch layers.

22. The method of claim 21, wherein the silicon dioxide etch stop layers are thermally grown in steam at a temperature below about 600° C.

23. The method of claim 19, wherein forming the multilayer structure comprises depositing silicon dioxide etch stop layers on respective amorphous silicon etch layers.

24. The method of claim 23, wherein the silicon dioxide etch stop layers are deposited by chemical vapor deposition.

25. The method of claim 19, wherein forming the multilayer structure comprises depositing amorphous silicon etch layers by chemical vapor deposition.

26. The method of claim 25, wherein the amorphous silicon etch layers are deposited by low pressure chemical vapor deposition.

27. The method of claim 25, wherein the amorphous silicon etch layers are deposited at a temperature below about 600° C.

28. The method of claim 14, wherein etch layers are formed of silicon dioxide and etch stop layers are formed of silicon.

29. The method of claim 28, wherein forming the multilayer structure comprises oxidizing an upper portion of an amorphous silicon layer to form a silicon dioxide etch layer and an underlying silicon etch stop layer.

30. The method of claim 29, wherein oxidizing the upper portion of the amorphous silicon layer comprises thermally growing a silicon dioxide cap layer on a top portion of the amorphous silicon layer and subsequently thermally oxidizing the remaining upper portion of the amorphous silicon layer.

31. The method of claim 30, wherein the cap layer is thermally grown at a temperature below about 600° C. and the remaining upper portion of the amorphous silicon layer is thermally oxidized at a temperature above about 600° C.

32. The method of claim 31, wherein converting opaque layers comprises thermally oxidizing silicon etch stop layers in the multi-step optical structure.

* * * * *